United States Patent
Mitchell et al.

(10) Patent No.: US 10,289,114 B2
(45) Date of Patent: May 14, 2019

(54) SAFETY CONTROLS FOR NETWORK CONNECTED AUTONOMOUS VEHICLE

(71) Applicant: THE BOEING COMPANY, Chicago, IL (US)

(72) Inventors: Timothy M. Mitchell, Seattle, WA (US); Jason W. Shelton, Edgewood, WA (US); Jack D. Lawson, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/671,820

(22) Filed: Aug. 8, 2017

(65) Prior Publication Data

US 2019/0049954 A1 Feb. 14, 2019

(51) Int. Cl.
 *G05D 1/00* (2006.01)
 *G06F 19/00* (2018.01)
 *G05D 1/02* (2006.01)

(52) U.S. Cl.
 CPC ......... *G05D 1/0061* (2013.01); *G05D 1/0276* (2013.01); *G05D 2201/0213* (2013.01)

(58) Field of Classification Search
 CPC ............... G05D 1/0061; G05D 1/0076; G05D 2201/0213
 USPC .......................................................... 701/23
 See application file for complete search history.

(56) References Cited

U.S. PATENT DOCUMENTS

| | | | |
|---|---|---|---|
| 7,269,504 B2 * | 9/2007 | Gardner | G01C 21/26 340/988 |
| 9,369,868 B2 | 6/2016 | Nguyen et al. | |
| 9,616,896 B1 | 4/2017 | Letwin et al. | |
| 2010/0256835 A1 | 10/2010 | Mudalige | |
| 2017/0015331 A1 | 1/2017 | Laur et al. | |
| 2017/0088145 A1 | 3/2017 | Gordon et al. | |
| 2017/0106876 A1 | 4/2017 | Gordon et al. | |
| 2017/0279957 A1 * | 9/2017 | Abramson et al. | H04M 1/72577 |

OTHER PUBLICATIONS

Extended European Search Report for Application No. DA/18496/NMO dated Jul. 1, 2019.
Kristian Karlsson et al: 11 Field Measurements of IEEE 802.llp Communication in NLOS Environments for a Platooning Application 11, Vehicular Technology Conference (VTC FALL). 2012 IEEE, IEEE, Sep. 3, 2012 (Sep. 3, 2012), pp. 1-5.

* cited by examiner

*Primary Examiner* — Tan Q Nguyen
(74) *Attorney, Agent, or Firm* — Patterson + Sheridan, LLP (57) ABSTRACT

Method and apparatus for ensuring safety controls for a network-connected autonomous vehicle. The method and apparatus monitor a respective state of each of one or more data communication connections one or more data communication networks. One of a plurality of operational modes for the autonomous vehicle is selected based on the monitored states. Each of the plurality of operational modes defines a respective level of autonomous control for the autonomous vehicle. The method and apparatus transition operation of the autonomous vehicle to the selected operational mode.

20 Claims, 5 Drawing Sheets

FIG. 6

SAFETY CONTROLS FOR NETWORK CONNECTED AUTONOMOUS VEHICLE

BACKGROUND

The present disclosure relates to safely operating an autonomous vehicle, and more particularly, to managing a level of manual control of an autonomous vehicle based on network state information Generally, autonomous vehicles can be configured to operate in a manual mode (e.g., where a human driver manually controls the movement of the vehicle) or in an autonomous mode (e.g., where computer logic controls the movement of the vehicle). Autonomous vehicles typically use various computing systems and communication networks to control the movement of the vehicle when travelling from one location to another. The level of manual control of a human occupant of an autonomous vehicle may vary, from essentially requiring no input from the human occupant to requiring initial input (or continuous) input from the human occupant, to requiring the human occupant to manually control the operation of the vehicle.

SUMMARY

One embodiment of the present invention provides a method of ensuring safety controls for a network-connected autonomous vehicle. The method includes monitoring a respective state of each of one or more data communication connections across one or more data communication networks. Additionally, the method includes selecting one of a plurality of operational modes for the autonomous vehicle based on the monitored states. Each of the plurality of operational modes defines a respective level of autonomous control for the autonomous vehicle. The method also includes transitioning operation of the autonomous vehicle to the selected operational mode.

In one aspect, in combination with any example above, the method further includes determining real-time weather conditions relating to operation of the autonomous vehicle, wherein selecting one of the plurality of operational modes for the autonomous vehicle is further based on the determined real-time weather conditions.

In one aspect, in combination with any example above, the method further includes determining real-time road conditions relating to operation of the autonomous vehicle, wherein selecting one of the plurality of operational modes for the autonomous vehicle is further based on the determined real-time road conditions.

In one aspect, in combination with any example above, the method further includes collecting real-time data, using one or more sensor devices of the autonomous vehicle, describing one or more attributes of a manually controlled vehicle that is proximate to the autonomous vehicle and transmitting the collected real-time data to a remote system for use in managing an operation of one or more autonomous vehicles.

In one aspect, in combination with any example above, the method further includes receiving, from a remote system, real-time data collected using one or more sensor devices of one or more autonomous vehicles, the real-time data describing one or more attributes of a manually controlled vehicle that is proximate to the autonomous vehicle, where selecting one of the plurality of operational modes for the autonomous vehicle is further based on the received real-time data.

In one aspect, in combination with any example above, the method further includes determining a measure of driving skill of an operator of the autonomous vehicle, wherein selecting one of the plurality of operational modes for the autonomous vehicle is further based on the measure of driving skill.

In one aspect, in combination with any example above, the method further includes determining an operational mode of one or more autonomous vehicles operating in proximity to the autonomous vehicle, wherein selecting one of the plurality of operational modes for the autonomous vehicle is further based on the operational mode of the one or more autonomous vehicles.

In one aspect, in combination with any example above, the selected operational mode for the autonomous vehicle further comprises at least one of (i) a fully autonomous operational mode, (ii) a partially autonomous operational mode, and (iii) a fully manual operational mode.

In one aspect, in combination with any example above, the partially autonomous mode further comprises disabling one or more entertainment systems within the autonomous vehicle, while continuing to operate the autonomous vehicle in a computer controlled manner.

In one aspect, in combination with any example above, the method further includes determining a level of driver skill of an operator of the autonomous vehicle, and updating a data model based on the level of driver skill, wherein the data model is used in selecting the operational mode for the autonomous vehicle.

In one aspect, in combination with any example above, determining the level of driver skill of the operator of the autonomous vehicle further comprises instructing the operator of the autonomous vehicle to perform one or more driving operations, wherein determining the level of driver skill is based at least in part on the operator's performance of the one or more driving operations.

In one aspect, in combination with any example above, determining the level of driver skill of the operator of the autonomous vehicle further comprises retrieving a driver history for the operator of the autonomous vehicle, wherein determining the level of driver skill is based at least in part on the retrieved driver history.

In one aspect, in combination with any example above, determining the level of driver skill of the operator of the autonomous vehicle further comprises monitoring driving behavior of the operator of the autonomous vehicle, while the autonomous vehicle is in a manual control operational mode, and assessing the driving behavior of the operator of the autonomous vehicle, by comparing the monitored driving behavior with a statistically determined optimal driving behavior for the autonomous vehicle, wherein determining the level of driver skill is based at least in part on the assessment of the operator's driving behavior.

In one aspect, in combination with any example above, the method further includes transmitting a notification over a data communications network, notifying a remote system of the transition to the selected operational mode for the autonomous vehicle.

In one aspect, in combination with any example above, the selected operational mode for the autonomous vehicle further comprises at least one of (i) a full authority autonomous operational mode, (ii) a supervisory operational mode, (iii) an alert operator operational mode, (iv) an aware operator operational mode, (v) a conscious operator operational mode, (vi) a sleeping operator operational mode, and (vii) a no operator operational mode.

In one aspect, in combination with any example above, the method further includes providing an indication of the selected operational mode to vehicles in proximity of the autonomous vehicle.

Another embodiment described herein provides a system that includes one or more computer processors and a memory containing computer program code that, when executed by operation of the one or more computer processors, performs an operation for ensuring safety controls for a network-connected autonomous vehicle. The operation includes monitoring a respective state of each of one or more data communication connections across one or more data communication networks. The operation further includes selecting one of a plurality of operational modes for the autonomous vehicle based on the monitored states, wherein each of the plurality of operational modes defines a respective level of autonomous control for the autonomous vehicle. Additionally, the operation includes transitioning operation of the autonomous vehicle to the selected operational mode.

In one aspect, in combination with any example above, the operation further includes determining real-time weather conditions relating to operation of the autonomous vehicle, determining real-time road conditions relating to operation of the autonomous vehicle, determining a measure of driving skill of an operator of the autonomous vehicle, determining an operational mode of one or more autonomous vehicles operating in proximity to the autonomous vehicle, wherein selecting one of the plurality of operational modes for the autonomous vehicle is further based on the real-time weather conditions, the real-time road conditions, the measure of driving skill of the operator of the autonomous vehicle, and the operational mode of the one or more autonomous vehicles.

In one aspect, in combination with any example above, the operation further includes determining a level of driver skill of an operator of the autonomous vehicle, and updating a data model based on the level of driver skill, wherein the data model is used in selecting the operational mode for the autonomous vehicle.

In one aspect, in combination with any example above, the selected operational mode for the autonomous vehicle further comprises at least one of (i) a full authority autonomous operational mode, (ii) a supervisory operational mode, (iii) an alert operator operational mode, (iv) an aware operator operational mode, (v) a conscious operator operational mode, (vi) a sleeping operator operational mode, and (vii) a no operator operational mode.

Yet another embodiment described herein provides a non-transitory computer-readable medium containing computer program code that, when executed by operation of one or more computer processors, performs an operation for ensuring safety controls for a network-connected autonomous vehicle. The operation includes monitoring a respective state of each of one or more data communication connections across one or more data communication networks. The operation further includes selecting one of a plurality of operational modes for the autonomous vehicle based on the monitored states, wherein each of the plurality of operational modes defines a respective level of autonomous control for the autonomous vehicle. Additionally, the operation includes transitioning operation of the autonomous vehicle to the selected operational mode.

BRIEF DESCRIPTION OF ILLUSTRATIONS

DETAILED DESCRIPTION

Figure 1:
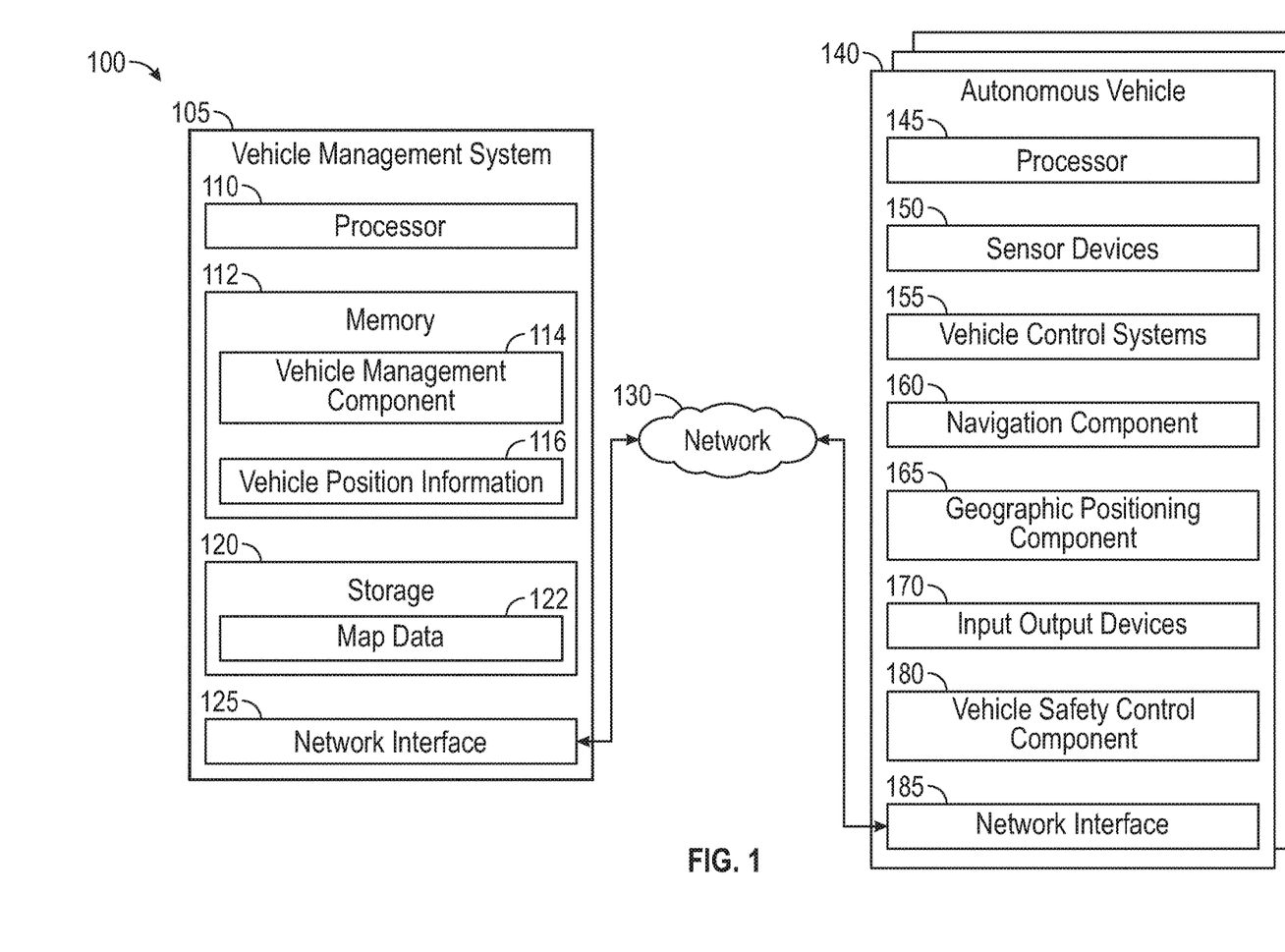
FIG. 1 is a block diagram illustrating a system configured with a vehicle safety control component, according to one embodiment described herein.

FIG. 1 is a block diagram illustrating a system configured with a vehicle safety control component, according to one embodiment described herein. As shown, the system 100 includes a vehicle management system 105 and a plurality of autonomous vehicles 140, interconnected by a data communications network 130. The vehicle management system 105 includes, without limitation, one or more computer processors 110, a memory 112, and storage 120, and a network interface 125, each connected to a bus (not shown). The vehicle management system 105 may also include an input/output (I/O) device interface (not shown) connecting I/O devices (e.g., keyboard, mouse, and display devices) to the vehicle management system 105. Further, in context of this disclosure, the computing elements shown in the vehicle management system 105 may correspond to a physical computing system (e.g., a system in a data center) or may be a virtual computing instance executing within a computing cloud.

Generally, the computer processor(s) 110 retrieves and executes programming instructions stored in the memory 112 as well as stores and retrieves application data residing in the memory 112. The bus is used to transmit programming instructions and application data between computer processor(s) 110, I/O devices interface, storage 120, a network interface (not shown), and memory 112. Note, computer processor(s) 110 is included to be representative of a single CPU, multiple CPUs, a single CPU having multiple processing cores, and the like. Memory 112 is generally included to be representative of a random access memory. Storage 120 may be a disk drive storage device. Although shown as a single unit, storage 120 may be a combination of fixed and/or removable storage devices, such as fixed disc drives, removable memory cards, or optical storage, network attached storage (NAS), or a storage area-network (SAN).

Illustratively, the memory 112 includes a vehicle management component 114, vehicle positioning information 116 and an operating system (not shown). The storage 120 includes map data 122. The vehicle management component 114 can communicate with the autonomous vehicles 140 (e.g., using network 130) during driving operations to collect the vehicle positioning information 114 specifying the positions of the autonomous vehicles 140. Additionally, the vehicle management component 114 can transmit information to the autonomous vehicles 140, to assist in autonomous driving operations. For example, the vehicle management component 114 can identify to a particular autonomous vehicle 140, other autonomous vehicles 140 in proximity on the road to the particular autonomous vehicle 140. Doing so can help the particular autonomous vehicle 140 distinguish between manually driven and autonomously driven vehicles on the road and to adjust automated driving operations accordingly.

In the depicted embodiment, an autonomous vehicle 140 contains a processor 145, sensor devices 150, vehicle control systems 155, a navigation component 160, a geographic positioning component 165, I/O devices 170, a vehicle safety management component 180 and a network interface 185. The processor(s) 145 generally retrieves and executes programming instructions stored in a memory (not shown) as well as stores and retrieves application data residing in the memory. A bus (not shown) may be used to transmit programming instructions and application data between computer processor(s) 145, sensor devices 150, vehicle control systems 155, navigation component 160, I/O devices 170, and network interface 185. Note, processor(s) 145 is included to be representative of a single CPU, multiple CPUs, a single CPU having multiple processing cores, and the like. The autonomous vehicle 140 may further contain a memory device (not shown). In an embodiment where the vehicle safety management component 180 is a software application, the vehicle safety management component 180 may reside within such a memory device. For example, the memory device may be a random access memory. The autonomous vehicle 140 may further contain a storage memory, such as a disk drive storage device. Additional examples of the storage memory may include a combination of fixed and/or removable storage devices, such as fixed disc drives, removable memory cards, or optical storage, network attached storage (NAS), or a storage area-network (SAN).

The sensor devices 150 can collect sensor data for use in managing autonomous driving operation of the autonomous vehicle 140. Such sensor devices 150 can include, for example, camera devices, a Light Detection and Ranging (LIDAR) system capable of providing an accurate, three-dimensional representation of the physical environment surrounding the autonomous vehicle 140, radar sensors, system monitoring sensors (e.g., battery level sensors, temperature sensors, oil level sensors, etc.) and so on. The vehicle control systems 155 generally represent vehicle subsystems that aid in the operation of the autonomous vehicle 140. For example, the vehicle control systems 155 can include parking aid systems, climate control systems, engine management systems, wiper control systems, transmission control systems, and so on.

The geographic positioning component 165 can generally determine the geographic position of the autonomous vehicle 140. For example, the geographic positioning component 165 comprises a Global Positioning System (GPS) transceiver capable of determining the coordinate position of the autonomous vehicle 140. The navigation component 160 generally contains logic configured to access map data and to determine a route to a specified destination, based on the current position of the vehicle. Generally, the input/output devices 170 can be used to collect input from the occupant of the vehicle (e.g., via a touchscreen device) and to provide feedback to the occupant of the vehicle.

The vehicle safety management component 180 is generally configured to control the operational state of the autonomous vehicle 140, e.g., based on the operational state of the autonomous vehicle 140 and the network interface's 185 uplink to the network 130. Of note, while only a single network interface 185 and network 130 are shown in the diagram 100, more generally an autonomous vehicle 140 can include multiple network interfaces 185, connecting to multiple distinct networks 130. Examples include network interfaces 185 providing an Internet uplink, cellular network interfaces, GPS network interfaces, satellite radio network interfaces, and so on.

For example, the vehicle safety management component 180 could determine that, when all computerized systems and network uplinks are 100% operational, the autonomous vehicle 140 can operate in a fully automated fashion and at the maximum allowed speed. As another example, the vehicle safety management component 180 could determine that, where the computerized systems and network uplinks of the autonomous vehicle 140 are operational but functioning at 80% capacity, the vehicle safety management component 180 could transition to a state in which the autonomous vehicle continues to operate autonomously, but the operator within the vehicle must be conscious and alert. In such an example, the vehicle safety management component 180 could disable one or more entertainment systems within the vehicle that could generally prevent the driver from being alert. For example, the vehicle safety management component 180 could disable to playback of video media (e.g., a Blu-Ray disc) within the vehicle while in the alert state, to help ensure the operator will be paying attention to the road as opposed to the video. Additionally, the vehicle safety management component 180 could prompt the user (e.g., using one or more I/O Devices 170, such as speaker devices, display devices, and so on) to instruct the user to be alert, even though the vehicle 140 is still operating autonomously.

In addition to requiring the user to be more alert during particular operational states, the vehicle safety management component 180 can control the behavior of the autonomous vehicle 140 differently, depending on the currently active operational state. For example, when the vehicle safety management component 180 has transitioned to a particular operational state based on a determination that the user is asleep, the vehicle safety management component 180 could operate the vehicle in autonomous fashion at full speed only when the computerized systems and network uplinks of the autonomous vehicle are at 90% operational capacity or greater. If the vehicle safety management component 180 determines that the computerized systems and network uplinks are operating at less than 90% capacity or upon determining that a particular system or network uplink has gone down altogether, the vehicle safety management component 180 could perform a corrective action for the autonomous vehicle 140. For example, the vehicle safety management component 180 could reduce the maximum speed the autonomous vehicle 140 can operate at or even pull the autonomous vehicle 140 over to the side of the road.

Figure 2:
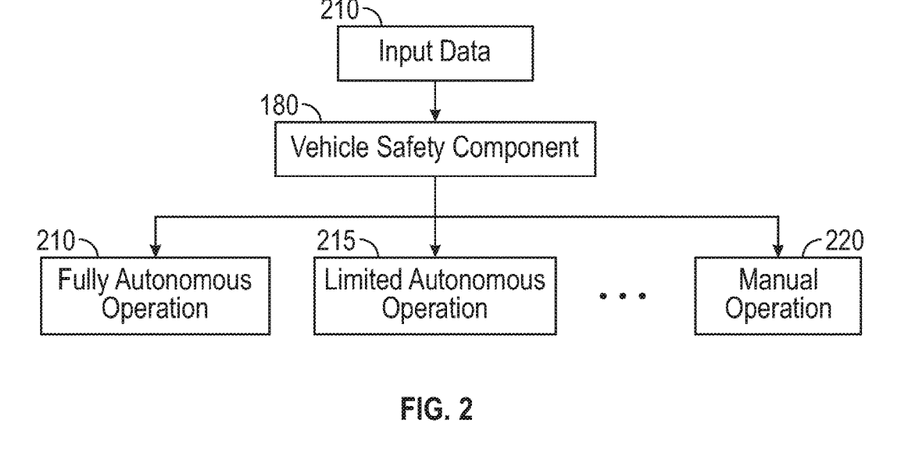
FIG. 2 illustrates a workflow for a vehicle safety control component selecting an operational mode based on input data, according to one embodiment described herein.

FIG. 2 illustrates a workflow for a vehicle safety control component selecting an operational mode based on input data, according to one embodiment described herein. As shown, the workflow 200 illustrates the vehicle safety management component 180 processing input data 210 and selecting one of the operational states 210, 215 and 220 for the autonomous vehicle 140, based on the analysis of the input data 210. In the depicted embodiment, the vehicle safety management component 180 has selected the limited autonomous operation mode 215, based on the analysis of the input data 210.

For example, the vehicle safety management component 180 could determine that the computerized systems and network uplinks of the autonomous vehicle are all operational but are only operating at 90% of capacity. As a result, the vehicle safety management component 180 could select the limited autonomous operation mode 215, in which the vehicle continues to operate autonomously but with an increased minimum vehicle spacing (e.g., defining how closely the autonomous vehicle 140 can operate with respect to other vehicles on the road). In some embodiments, the vehicle safety management component 180 can consider only certain networks and computerized systems when making the determination as to whether to adjust the operational state of the autonomous vehicle 140. For example, if the vehicle safety management component 180 determines that the uplink to the vehicle management system 105 is operating at 100% operational capacity but the satellite radio uplink is not operational, the vehicle safety management component 180 could remain in a fully autonomous operational mode. On the other hand, if the vehicle safety management component 180 determines that the uplink to the vehicle management system 105 has gone down but the satellite radio uplink is operating at 100% operational capacity, the vehicle safety management component 180 could transition to an operational mode in which the operator must assume manual control of the vehicle or the vehicle must pull over to the side of the road.

In addition to consider the operational state of computerized systems and network uplinks of the autonomous vehicle 140, the vehicle safety management component 180 can be configured to consider a number of other sources of information. For example, the vehicle safety management component 180 could consider a level of security of one or more data communication connections for the autonomous vehicle. As an example, the vehicle safety management component 180 could be configured to monitor for alerts generated in the event of a cyberattack on the autonomous vehicle, and in the event a security condition is satisfied (e.g., a predefined number of alerts are received within a window of time, a particularly severe alert is received, etc.), the vehicle safety management component 180 could transition the operating mode of the autonomous vehicle accordingly. For example, when the vehicle safety management component 180 determines a security condition has been satisfied, the vehicle safety management component 180 could transition the operating mode of the autonomous vehicle to a manual control mode and could disable one or more autonomous driving functions, until the security condition is alleviated. In one embodiment, the vehicle safety management component 180 can also enter a heightened security mode for the autonomous vehicle, which prevents the download of additional data to the autonomous vehicle until the autonomous vehicle is at rest.

Figure 3:
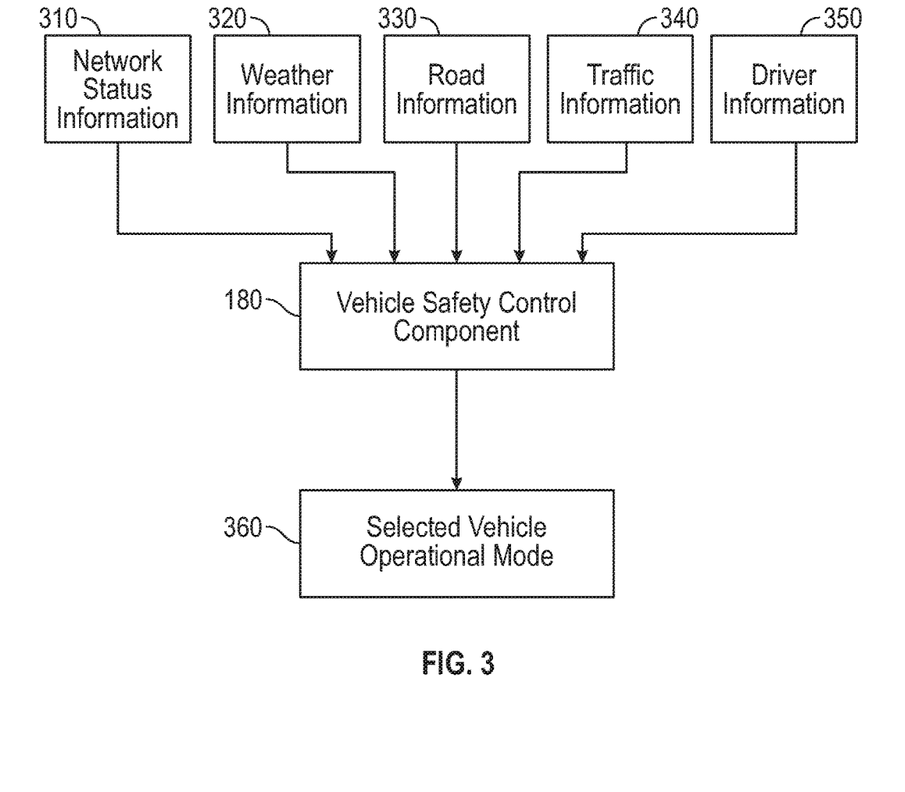
FIG. 3 illustrates a workflow for a vehicle safety control component selecting an operational mode based on exemplary types of input data, according to one embodiment described herein.

An example of one embodiment is shown in FIG. 3, which illustrates a workflow for a vehicle safety control component selecting an operational mode based on exemplary types of input data, according to one embodiment described herein. As shown, the workflow 300 illustrates the vehicle safety management component 180 consider network status information 310, weather information 320, road information 330, traffic information and driver information 350, in selecting the vehicle operational mode 360.

For example, the vehicle safety management component 180 could analyze weather information 320 to determine current weather conditions surrounding the autonomous vehicle, and could alter a threshold for setting the operational mode for the autonomous vehicle 140 based on the weather information 320. As an example, if the vehicle safety management component 180 determines that the autonomous vehicle is currently operating in inclement weather conditions (e.g., heavy rain, snow, etc.), the vehicle safety management component 180 could dynamically adjust the thresholds in rules that control the transitions between operational states of the vehicle 140. For instance, the vehicle safety management component 180 could adjust the thresholds to transition to a more conservative operational state (e.g., requiring more operator supervision, if not manual control), when facing inclement weather conditions. Alternatively, when facing ideal weather conditions, the vehicle safety management component 180 could be less conservative with regard to requiring operator oversight of the autonomous vehicle 140, as the autonomous driving systems within the autonomous vehicle 140 may operate more efficiently under ideal weather conditions.

As another example, the vehicle safety management component 180 can be configured to consider the driver information 350 in adjusting the rules and thresholds that control the transition between operational states. For example, if the vehicle safety management component 180 determines that the operator of the vehicle is a highly skilled driver, the vehicle safety management component 180 could be more likely to transition to an operational mode that requires operator oversight or requires the operator to manually drive the vehicle 140, as the operator may be more skilled at driving than the vehicle than the autonomous driving controls under certain conditions (e.g., inclement weather). For example, the vehicle safety management component 180 could determine the operator's driving skill by providing one or more driving tests to the operator and evaluating how well the operator performs the driving tests. As another example, the vehicle safety management component 180 could monitor the operator's behavior when manually driving the vehicle 140 over a window of time and can compare the operator's driving to an optimal manner of driving the vehicle 140 (e.g., a data model trained by monitoring highly skilled drivers).

Generally, the vehicle safety management component 180 can be configured to employ any number of machine learning and data modeling techniques when modeling the driver's skill, an optimal driver's behavior, and so on. For example, in one embodiment, a centralized vehicle safety management component 180 could be deployed on a centralized compute node (e.g., within a cloud computing environment) and data could be collected from a substantial number of intelligent vehicles when they are operated in a manual mode. Such data could include, for example, the speed at which the vehicles operate, how the vehicles behave relative to nearby vehicles (e.g., the distance maintained relative to the vehicle ahead of the given vehicle, when the vehicles turn in front of oncoming traffic, etc.), and so on. Additionally, the vehicle safety management component 180 could collect data on the drivers of the vehicles, such as how many traffic offenses the driver has had, how many emergency actions the driver has taken while operating the vehicle (e.g., slamming on the brakes to avoid a collision). The vehicle safety management component 180 could then generate a data model that correlates driving behaviors with driver skill. For example, the vehicle safety management component 180 could train a neural network that accepts as inputs a number of driver attributes (e.g., data values collected or derived from a user operating a vehicle) and outputs a predicted driving skill of the user. The vehicle safety management component 180 could then use the neural network to evaluate a particular driver's skill, as the driver operates a vehicle. Other examples include, without limitation, the vehicle safety management component 180 training and using a machine learning classifier to classify the driver into one or more skill categories (e.g., good driver, average driver, poor driver) based on driver attributes of the driver, a machine learning regression model to output an estimated driving skill score for a driver, based on driver attributes, and so on. More generally, any suitable machine learning or data modelling technique can be used, consistent with the functionality described herein.

Figure 4:
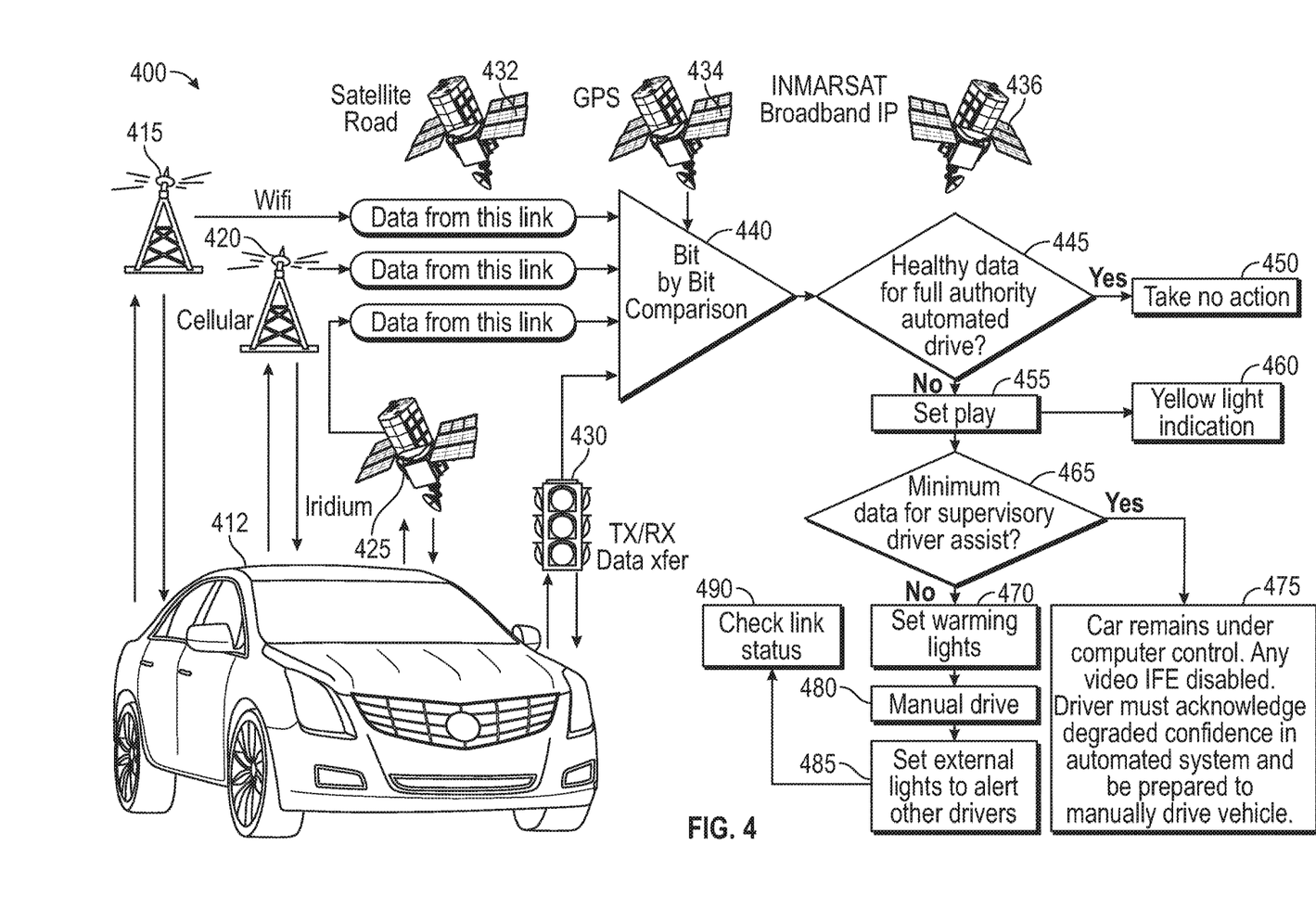
FIG. 4 is a flow diagram illustrating a method for controlling the operational mode of an autonomous vehicle, according to one embodiment described herein.

FIG. 4 is a flow diagram illustrating a method for controlling the operational mode of an autonomous vehicle, according to one embodiment described herein. As shown, the workflow 400 depicts a vehicle 410, having a number of vehicle subsystems (e.g., autonomous vehicle 140). In the depicted embodiment, the vehicle 410 has data communications with a WiFi network 415, a cellular network 420, a satellite network (e.g., Iridium) and a local area autonomous driving network 430. Additionally, the vehicle 410 is in communication with a satellite radio network 432, a GPS network 434 and an International Mobile Satellite Organization (INMARSAT) network 436.

In the depicted embodiment, the vehicle safety management component 180 performs a bit by bit comparison of data received on the various networks, to determine a measure of operational capacity for each of the networks. For example, if the vehicle safety management component 180 determines that a particular one of the networks (e.g., the cellular network 420) is experiencing a high degree of packet loss, the vehicle safety management component 180 could determine that the network is currently operating in an unhealthy state. If the vehicle safety management component 180 determines (at block 445) that the various network uplinks of the vehicle 410 are operating in a healthy state sufficient to enable a fully autonomous driving operational mode, the vehicle safety management component 180 can take no further action (block 450) and can allow the vehicle 410 to continue operating in a fully autonomous driving mode. In such an example, the vehicle safety management component 180 can continue to monitor the health of the vehicle's various network uplinks, to determine if and when a correct action should be performed for the vehicle 410.

If the vehicle safety management component 180 determines that the data does not indicate a fully healthy network state, the vehicle safety management component 180 can set a flag indicating that the vehicle uplinks are operating at less than optimal capacity (block 455) and can display a warning light to this effect to the operator of the vehicle (block 460). Additionally, the vehicle safety management component 180 can determine whether a minimum level of data communication is available on the data communication networks, in order to enable a supervisory driver assist operational mode (block 465). That is, the vehicle safety management component 180 can determine whether a limited autonomous driving operational mode is appropriate, given the current network conditions (block 475). As an example, such a limited autonomous driving operational mode could maintain autonomous driving functions, but could instruct the user to remain alert to current road conditions. In such an operational mode, the vehicle safety management component 180 could disable select media functionality (e.g., video playback), to help ensure the user remains alert to the current road conditions. Additionally, the vehicle safety management component 180 could require the operator of the vehicle to acknowledge (e.g., verbally, by pressing a button on a touchscreen screen device, etc.) the transition to the limited autonomous driving operational mode.

If the vehicle safety management component 180 determines that a minimum level of network connectivity is not currently available for the vehicle 410, the vehicle safety management component 180 activates a warning light(s) within the vehicle (block 470), transitions to a manual driving operational mode (block 480), and activates one or more external indicators (e.g., lights) to inform other drivers that the autonomous vehicle has entered a manual driving mode (block 485). The vehicle safety management component 180 continues checking the link status (block 490) to determine how to continuously update the operational state of the autonomous vehicle.

As discussed above, in some embodiments, the vehicle safety management component 180 can update the operational state of the vehicle based on factors in addition to (or on lieu of) the network connectivity of the autonomous vehicle. For example, the vehicle safety management component 180 could consider current road conditions of a road on which the autonomous vehicle is currently operator. For example, if the vehicle safety management component 180 determines that the road is currently under construction (e.g., in which case lanes may be defined by safety cones, as opposed to painted lines), the vehicle safety management component 180 could transition to a manual driving operational state, as the operator may be more adept at navigating the uncertain road conditions.

Figure 5:
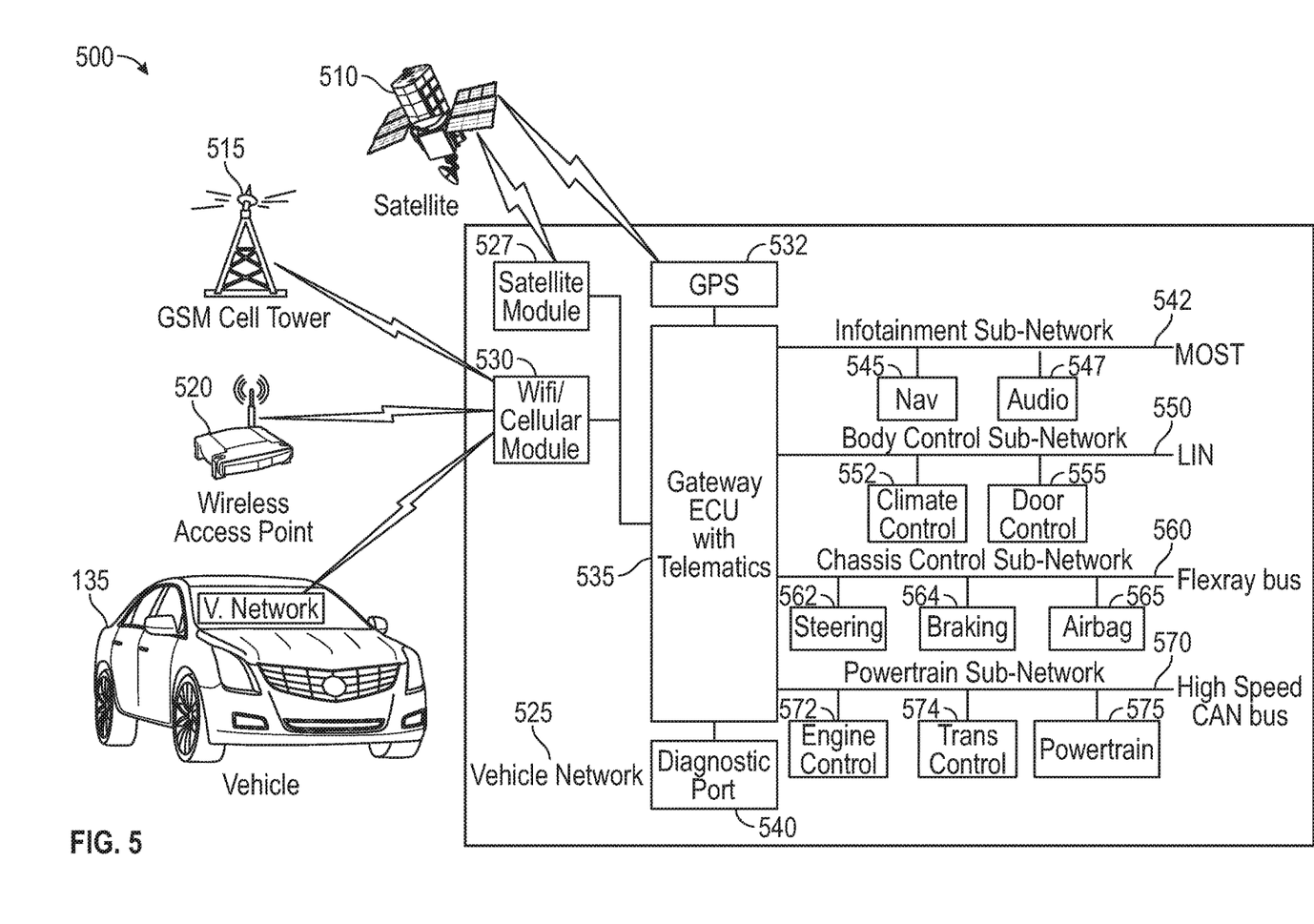
FIG. 5 is a block diagram illustrating a vehicle network, according to one embodiment described herein.

FIG. 5 is a block diagram illustrating a vehicle network, according to one embodiment described herein. As shown, the system 500 includes a vehicle network 525, connected to a satellite network 510, a Global Systems for Mobile Communications (GSM) cellular tower 515, a wireless access point 520 and nearby autonomous vehicles 135. The vehicle network 525 includes a satellite module 527 and a GPS transceiver for communicating with one or more satellite networks (e.g., satellite network 510), and a WiFi and/or cellular network interface 530 for communicating with WiFi and/or cellular networks (e.g., GSM cell tower 515, wireless access point 520, etc.). The GPS transceiver 532, satellite module 527 and WiFI/Cellular network module 530 in the depicted embodiment are in communication with an engine control unit (ECU) 535. The ECU 535 is in data communications with a diagnostics port 540, through which the system 500 (or a portion thereof) can be evaluated and updated by one or more diagnostics applications.

In the depicted embodiment, the ECU 535 is in communication with an infotainment sub-network 542, a body control sub-network 550, a chassis control subnetwork 560 and a powertrain sub-network 570. The infotainment sub-network 542 is in communication with a navigation module 545 and an audio module 547. The body control sub-network 550 is connected to a climate control module 552 and a door control module 555. The chassis control sub-network 560 is connected to a steering module 562, a braking module 564 and an airbag module 565. The powertrain sub-network 570 is connected to an engine control module 572, a transmission control module 574 and a powertrain module 575.

As discussed above, the vehicle safety management component 180 can monitor the network connectivity of the various network adapters (e.g., WiFi/Cellular communications module 530, satellite module 527, and GSP module 532) as well as the operational state of computerized systems (e.g., steering module 562, braking module 564, engine control module 572, etc.) within the vehicle network 525 to determine when to transition the operational state of the vehicle. For example, upon determining that the network adapters and/or the computerized systems of the vehicle are not operating in an optimal fashion, the vehicle safety management component 180 could transition to an operational state that requires additional operator oversight, if not manual control, of the vehicle.

Figure 6:
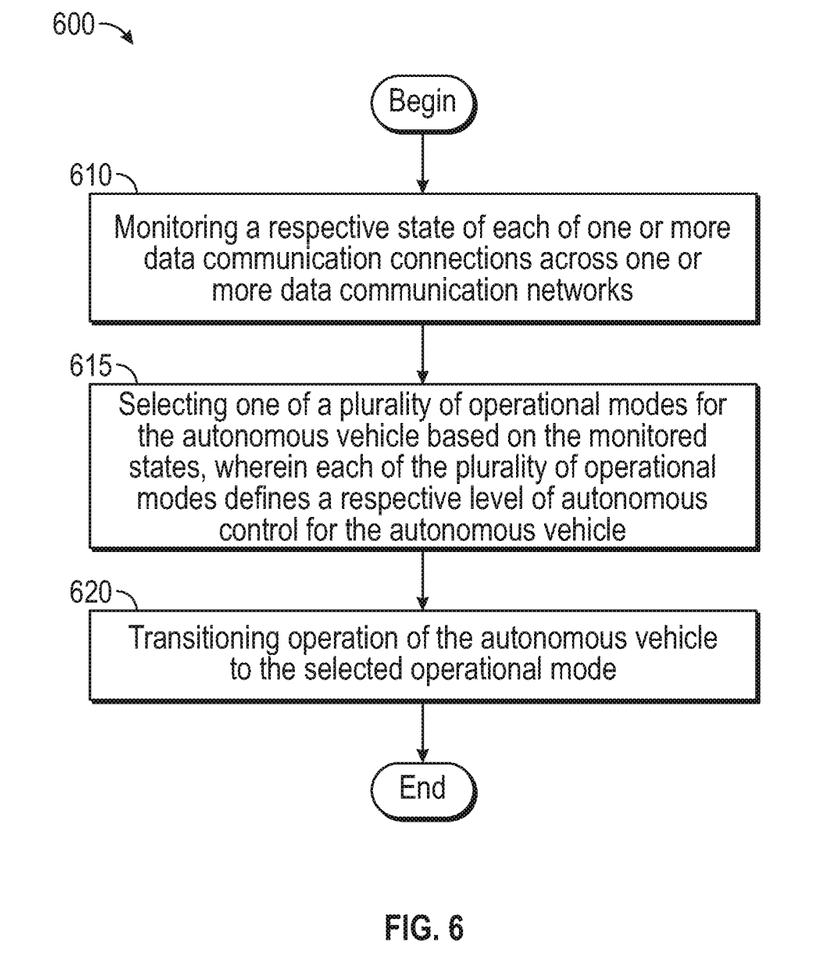
FIG. 6 is a flow diagram illustrating a method of transitioning operation of an autonomous vehicle to a selected operational mode based on network state information, according to one embodiment described herein.

FIG. 6 is a flow diagram illustrating a method of transitioning operation of an autonomous vehicle to a selected operational mode based on network state information, according to one embodiment described herein. As shown, the method 600 begins at block 610, where the vehicle safety management component 180 monitors a respective state of each of one or more data communication connections across one or more data communication networks. For example, the autonomous vehicle could be connected to a satellite data network, which in turn connects to a wired Ethernet network through a bridge device. In an embodiment where the autonomous vehicle communicates with a remote server with a path that spans both the satellite network and the Ethernet network, the vehicle safety management component 180 could monitor the state of the connection with the remote server, which can be affected by a service interruption in either the satellite and/or the Ethernet network.

The vehicle safety management component 180 selects one of a plurality of operational modes for the autonomous vehicle based on the monitored states, where each of the plurality of operational modes defines a respective level of autonomous control for the autonomous vehicle (block 615). The vehicle safety management component 180 then transitions operation of the autonomous vehicle to the selected operational mode (block 620), and the method 600 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of ensuring safety controls for a network-connected autonomous vehicle, comprising:

monitoring data collected for one or more network performance metrics for one or more data communication connections across one or more data communication networks, to determine a respective state of the one or more data communication connections;

selecting one of a plurality of operational modes for the autonomous vehicle based on the monitored states, wherein each of the plurality of operational modes defines a respective level of autonomous control for the autonomous vehicle; and transitioning operation of the autonomous vehicle to the selected operational mode.

2. The method of claim 1, further comprising:
determining real-time weather conditions relating to operation of the autonomous vehicle,
wherein selecting one of the plurality of operational modes for the autonomous vehicle is further based on the determined real-time weather conditions.

3. The method of claim 1, further comprising:
determining real-time road conditions relating to operation of the autonomous vehicle,
wherein selecting one of the plurality of operational modes for the autonomous vehicle is further based on the determined real-time road conditions.

4. The method of claim 1, further comprising:
collecting real-time data, using one or more sensor devices of the autonomous vehicle, describing one or more attributes of a second vehicle that is proximate to the autonomous vehicle; and
transmitting the collected real-time data to a remote system for use in managing an operation of one or more autonomous vehicles.

5. The method of claim 1, further comprising:
receiving, from a remote system, real-time data collected using one or more sensor devices of one or more autonomous vehicles, the real-time data describing one or more attributes of a manually controlled vehicle that is proximate to the autonomous vehicle,
wherein selecting one of the plurality of operational modes for the autonomous vehicle is further based on the received real-time data.

6. The method of claim 1, further comprising:
determining a measure of driving skill of an operator of the autonomous vehicle,
wherein selecting one of the plurality of operational modes for the autonomous vehicle is further based on the measure of driving skill.

7. The method of claim 1, further comprising:
determining an operational mode of one or more autonomous vehicles operating in proximity to the autonomous vehicle,
wherein selecting one of the plurality of operational modes for the autonomous vehicle is further based on the operational mode of the one or more autonomous vehicles.

8. The method of claim 1, wherein the selected operational mode for the autonomous vehicle further comprises at least one of (i) a fully autonomous operational mode, (ii) a partially autonomous operational mode, and (iii) a fully manual operational mode, wherein the partially autonomous mode further comprises disabling one or more entertainment systems within the autonomous vehicle, while continuing to operate the autonomous vehicle in a computer controlled manner.

9. The method of claim 1, further comprising:
determining a level of driver skill of an operator of the autonomous vehicle; and updating a data model based on the level of driver skill, wherein the data model is used in selecting the operational mode for the autonomous vehicle.

10. The method of claim 9, wherein determining the level of driver skill of the operator of the autonomous vehicle further comprises:
instructing the operator of the autonomous vehicle to perform one or more driving operations,
wherein determining the level of driver skill is based at least in part on the operator's performance of the one or more driving operations.

11. The method of claim 9, wherein determining the level of driver skill of the operator of the autonomous vehicle further comprises:
retrieving a driver history for the operator of the autonomous vehicle,
wherein determining the level of driver skill is based at least in part on the retrieved driver history.

12. The method of claim 9, wherein determining the level of driver skill of the operator of the autonomous vehicle further comprises:
monitoring driving behavior of the operator of the autonomous vehicle, while the autonomous vehicle is in a manual control operational mode; and
assessing the driving behavior of the operator of the autonomous vehicle, by comparing the monitored driving behavior with a determined optimal driving behavior for the autonomous vehicle,
wherein determining the level of driver skill is based at least in part on the assessment of the operator's driving behavior.

13. The method of claim 1, further comprising:
transmitting a notification over a data communications network, notifying a remote system of the transition to the selected operational mode for the autonomous vehicle.

14. The method of claim 1, wherein the selected operational mode for the autonomous vehicle further comprises at least one of (i) a full authority autonomous operational mode, (ii) a supervisory operational mode, (iii) an alert operator operational mode, (iv) an aware operator operational mode, (v) a conscious operator operational mode, (vi) a sleeping operator operational mode, and (vii) a no operator operational mode.

15. The method of claim 1, further comprising:
providing an indication of the selected operational mode to vehicles in proximity of the autonomous vehicle.

16. A system, comprising:
one or more computer processors; and
a memory containing computer program code that, when executed by operation of the one or more computer processors, performs an operation for ensuring safety controls for a network-connected autonomous vehicle, the operation comprising:
monitoring data collected for one or more network performance metrics for one or more data communication connections across one or more data communication networks, to determine a respective state of the one or more data communication connections;
selecting one of a plurality of operational modes for the autonomous vehicle based on the monitored states, wherein each of the plurality of operational modes defines a respective level of autonomous control for the autonomous vehicle; and
transitioning operation of the autonomous vehicle to the selected operational mode.

17. The system of claim 16, the operation further comprising:
 determining real-time weather conditions relating to operation of the autonomous vehicle;
 determining real-time road conditions relating to operation of the autonomous vehicle;
 determining a measure of driving skill of an operator of the autonomous vehicle; and
 determining an operational mode of one or more autonomous vehicles operating in proximity to the autonomous vehicle,
 wherein selecting one of the plurality of operational modes for the autonomous vehicle is further based on the real-time weather conditions, the real-time road conditions, the measure of driving skill of the operator of the autonomous vehicle, and the operational mode of the one or more autonomous vehicles.

18. The system of claim 16, the operation further comprising:
 determining a level of driver skill of an operator of the autonomous vehicle; and
 updating a data model based on the level of driver skill, wherein the data model is used in selecting the operational mode for the autonomous vehicle.

19. The system of claim 16, wherein the selected operational mode for the autonomous vehicle further comprises at least one of (i) a full authority autonomous operational mode, (ii) a supervisory operational mode, (iii) an alert operator operational mode, (iv) an aware operator operational mode, (v) a conscious operator operational mode, (vi) a sleeping operator operational mode, and (vii) a no operator operational mode.

20. A non-transitory computer-readable medium containing computer program code that, when executed by operation of one or more computer processors, performs an operation for ensuring safety controls for a network-connected autonomous vehicle, the operation comprising:
 monitoring data collected for one or more network performance metrics for one or more data communication connections across one or more data communication networks, to determine a respective state of the one or more data communication connections;
 selecting one of a plurality of operational modes for the autonomous vehicle based on the monitored states, wherein each of the plurality of operational modes defines a respective level of autonomous control for the autonomous vehicle; and
 transitioning operation of the autonomous vehicle to the selected operational mode.

* * * * *